(12) United States Patent
Gehler

(10) Patent No.: US 6,400,872 B1
(45) Date of Patent: Jun. 4, 2002

(54) TRIMMED INTEGRATED OPTICAL MULTI-BEAM INTERFEROMETER

(75) Inventor: Jörg Gehler, Stuttgart (DE)

(73) Assignee: Alcatel, Paris (FR)

( * ) Notice: Subject to any disclaimer, the term of this patent is extended or adjusted under 35 U.S.C. 154(b) by 27 days.

(21) Appl. No.: 09/637,237

(22) Filed: Aug. 11, 2000

(30) Foreign Application Priority Data

Aug. 13, 1999 (EP) .............................................. 99440223

(51) Int. Cl.[7] .............................. G02B 6/26; G02B 6/42
(52) U.S. Cl. ................... 385/39; 385/2; 385/3; 385/39; 385/40; 385/41; 385/46; 385/14
(58) Field of Search ........................... 385/2, 3, 39, 40, 385/41, 46, 14

(56) References Cited

U.S. PATENT DOCUMENTS

| | | | |
|---|---|---|---|
| 4,900,112 A | * 2/1990 | Kawachi et al. | 350/96.12 |
| 5,118,923 A | 6/1992 | Farina | 250/205 |
| 5,136,671 A | 8/1992 | Dragon | 385/46 |
| 5,506,925 A | * 4/1996 | Greene et al. | 385/129 |

FOREIGN PATENT DOCUMENTS

| | | | |
|---|---|---|---|
| EP | 0 297 851 A2 | 1/1989 | ................ 385/39 X |
| EP | 0 730 170 A2 | 9/1996 | ................ 385/39 X |
| EP | 0 756 184 A2 | 1/1997 | ................ 385/39 X |
| EP | 0 662 621 B1 | 5/1998 | ................ 385/39 X |

OTHER PUBLICATIONS

Zauner, D. A. et al.: "UV Trimming of Arrayed–Waveguide Grating Wavelength Division Demultiplexers" Electronics Letters, GB, IEE Stevenage, BD. 34, Nr,. 8, pp. 780–781, XP000781460 ISSN: 0013–5194.

* cited by examiner

Primary Examiner—Brain Healy
Assistant Examiner—Sarah Woo
(74) Attorney, Agent, or Firm—Sughrue Mion, PLLC

(57) ABSTRACT

For the trimming of an arrayed waveguide grating (1) of an integrated optical multi-beam interferometer which is comprised of a large number (N) of waveguides (i) at least one (j) of these waveguides (i) is treated over a region ($B_j$) along its optical path length ($L_j$) only by irradiation which changes its core refractive index ($n_j$) A defined phase shift ($\Delta\phi_j$) of the light signal guided in this waveguide (j) results thereby which leads to a long-lasting correction of the aberration of the interference pattern in the multi-beam interferometer.

9 Claims, 3 Drawing Sheets

TRIMMED INTEGRATED OPTICAL MULTI-BEAM INTERFEROMETER

BACKGROUND OF THE INVENTION

The invention concerns an integrated optical multi-beam interferometer with an arrayed waveguide grating.

Conventional optical switching equipment and optical multiplexers and demultiplexers comprise a connecting device with one or more input waveguides which are arranged close to one another and which are connected to the input of a free space region (star coupler). The output of the free space region is connected to an arrayed waveguide grating (AWG) which comprises a series of optical waveguides. The number of these waveguides can be more than 50. This is then called a dense wavelength division multiplexer (DWDM). The arrayed waveguide grating is connected to the entrance of a second free space region, the outputs of which are the outputs of the relaying device or the switch or the multiplexer or demultiplexer (see for example U.S. Pat. No. 5,136,671).

The waveguides of the arrayed waveguide grating differ in length in comparison to their closest neighbour by a predetermined fixed amount in each case. This enables several separate optically diverse wavelengths which are supplied to the device in different and separate input ports to be combined with one another by interference at a predetermined output port. In this manner the device is used as a multiplexer. The same device can also operate as a demultiplexer. In this case, several input wavelengths are present at a predetermined input port of the device. Optionally a single input port may be available. The input wavelengths are separated from one another and applied to a predetermined output port of the device. If several input ports are available a suitable selection of the input wavelengths also permits a switching between any selected input port and any selected output port. Optical frequency multiplexers/demultiplexers of this type can be produced in $SiO_2/Si$ technology for example in the form of so-called optical phase arrayed (phasar). Here a layer (buffer layer) of for example 15 $\mu$m of $SiO_2$ is grown on a silicon substrate by oxidation under high pressure steam. It serves to insulate the silicon substrate which has a very high refractive index. A second layer (core layer) of doped glass, doped for example with phosphorus or germanium, is laid over the oxide. The multi-beam interferometer is structured into this last layer by dry etching i.e. the free beam regions and all waveguides of the arrayed waveguide grating, and then covered with a layer of glass doped with phosphorus or boron which is several micrometres thick. The typical width of the core of a waveguide of the phase grating is in the range of 4.5 to 6.5 $\mu$m. The typical decoupling distance of adjacent waveguides of the arrayed waveguide grating is 30 $\mu$m from centre to centre of the respective waveguides. In addition the waveguides of the arrayed waveguide grating exhibit a circular arc-shaped form with, for example, a minimum radius of curvature of approximately 15 mm in the plane into which they are structured.

The loss on combining (multiplexer) or separating (demultiplexer) light signals which have wavelengths in the range of 1,200 nm up to 1,600 nm and differ from one another by up to only 0.4 nm or 0.2 nm for example is greatly dependent on the quality of the interference pattern produced from the light signals in the free space region radiating from the waveguides of the arrayed waveguide grating. Even with the most modern technology a certain aberration of the interference pattern in the free space region during production of the arrayed waveguide grating from a large number of waveguides with strictly defined optical lengths can only be avoided with difficulty.

A tuning device for an integrated optical multi-beam interferometer for correcting the aberration of the interference pattern in the free space region is known from EP 756 184 A2. The tuning device is based on the exploitation of thermo-optical effects which influence the core refractive index of the waveguides. The tuning device consists of an electrode structure which is applied over a region of the arrayed waveguide grating. The production of a certain amount of heat by this electrode structure causes a change in the refractive index of the core of the respective waveguides which are covered by it. Their optically effective length can be trimmed by this, which leads to the shift in the interference pattern of the light signals in the free beam region.

EP 662 621 B1 discloses a controllable phase shift device of the different waveguides of an arrayed waveguide grating. With the aid of this controllable phase shift device a phase shift of an optical wave guided in a specific waveguide can be produced in a targeted manner. A phase shift can be produced which differs greatly from waveguide to waveguide.

Controllable tuning devices of this kind have the great disadvantage that the arrayed waveguide grating must be provided with additional electronics in order to operate this tuning device. This creates increased costs and holds the danger that these electronics might fail which would lead to an unusable tuning device. An alternative is known from the essay "An all-fibre dense-wavelength-division multiplexer/demultiplexer using photoimprinted Bragg gratings" by F. Bilodeau et al in IEEE Photonics Technology Letters, 7 (1995), page 388f. It is based on the trimming of the core refractive index of a glass fibre by irradiation after it has been previously doped with $H_2$ molecules in order to increase the efficiency of this irradiation. A change in the refractive index of at least $10^{-3}$ can only be achieved with the aid of these $H_2$ molecules used as a catalyst. Here these molecules diffuse in time out of the doped sample of their own accord. This behaviour is even assisted in that the sample is usually annealed subsequently by heating. This leads however to a change in the Bragg wavelength which in the case of planar arrayed waveguide gratings are called central wavelengths. Therefore it is impossible to predict in which region exactly the sample handled according to this process will operate. This makes such a type of trimming very problematic and unreliable.

SUMMARY OF THE INVENTION

The object of the invention is to further develop an area waveguide grating of an integrated optical multi-beam interferometer in such a way that the aberrations in the interference pattern in the multi-beam interferometer are minimised and that this is done in a controlled manner.

The object is achieved by an integrated optical multi-beam interferometer with an arrayed waveguide grating comprising a large number of N waveguides (i), wherein at least one (j) of the N waveguides (i) has a selective region ($B_j$) along its optical path length ($L_j$) for trimming of the multi-beam interferometer which is treated only by an irradiation which changes its core refractive index ($n_j$).

By the targeted irradiation with UV of regions of some of the waveguides of the arrayed waveguide grating alone the core refractive index is lowered in these regions. The aberration of the interference pattern in the free space region can be minimised by this. As individual regions of the waveguide can be treated by focusing the UV beam it is possible to carry out the irradiation on the connected integrated optical multi-beam interferometers selectively as a function of the measured values of the combined or separated light signals. Therefore the arrayed waveguide grating can easily be trimmed in order, for example, to minimise the losses which occur in the transition from the arrayed waveguide grating to the respective waveguides in the free space region at certain wavelengths.

It has been found that this treatment according to the invention of the arrayed waveguide grating with UV radiation without doping these regions beforehand with $H_2$ molecules permits a controlled change (decrease or increase) in the core refractive index of these regions. In this way such integrated optical multi-beam interferometers can be trimmed very accurately and therefore have a distinctly improved mode of operation as a result of low loss rates and mixing rates of the processed optical signals.

Advantageous developments of the invention emerge from the dependent claims, the following description and the drawings.

BRIEF DESCRIPTION OF THE DRAWINGS

An embodiment of the invention will now be described in more detail with the aid of the accompanying drawings, in which.

DETAILED DESCRIPTION OF THE INVENTION

Figure 1:
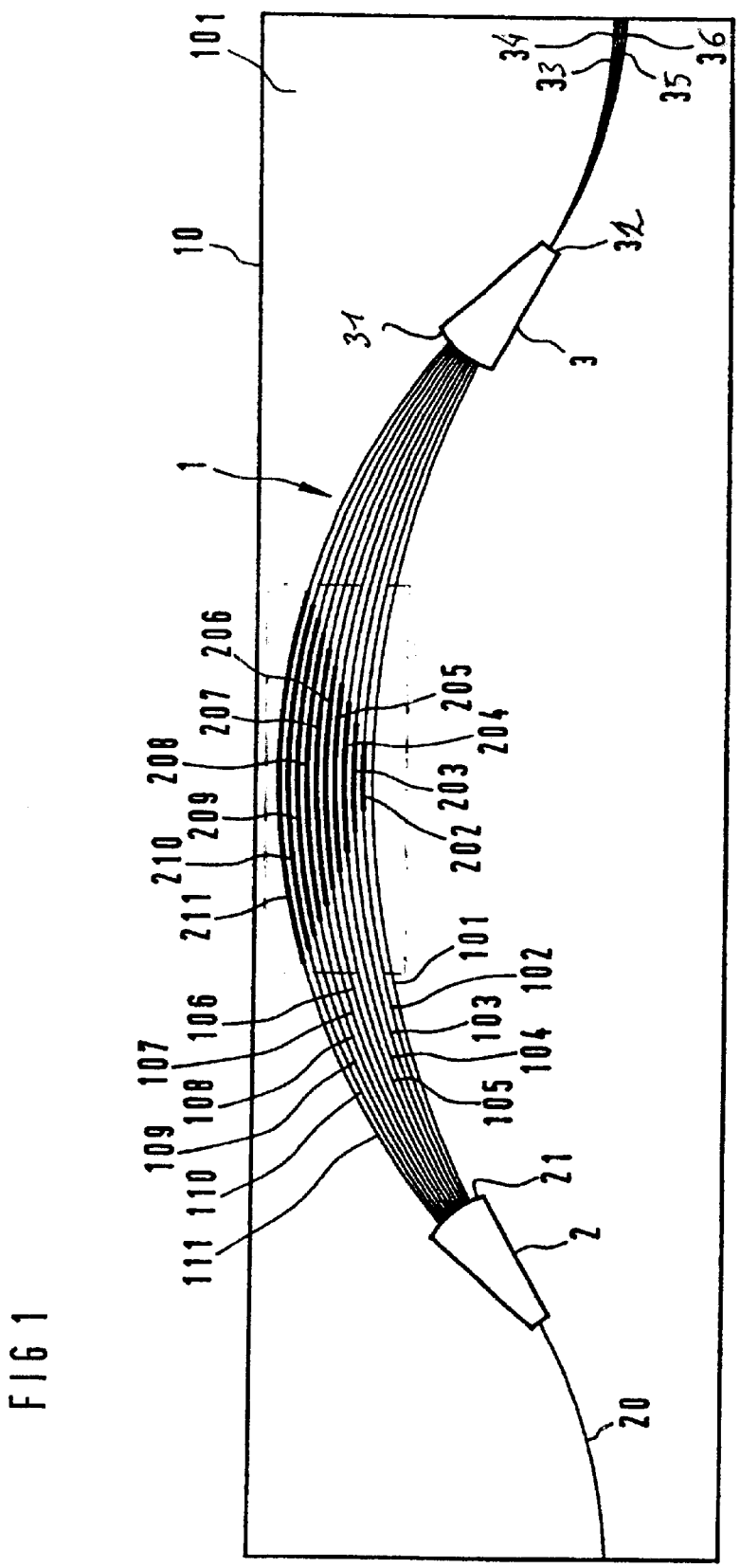
FIG. 1 is a plan view of an integrated optical multi-beam interferometer.

The integrated optical multi-beam interferometer illustrated in FIG. 1 in a plan view is structured into the plane $10_1$, of a layer which is supported by a substrate 10. The interferometer contains an arrayed waveguide grating 1 which is formed of a large number of closely integrated optical waveguides. A free space region 2, 3 is structured into the respective ends of this arrayed waveguide grating in each case. A light signal which is formed from an overlaying of several optical wavelengths is fed or removed via an integrated waveguide 20 from the remote end of the one free beam region 2 depending on whether the interferometer is used as a demultiplexer or multiplexer.

At the end remote from the arrayed waveguide grating 1 in the second free beam region 3 there are several waveguides 33 to 36 for the removal or supplying of optical light signals, the wavelengths of which were separated in each case or are to be overlayed.

In the following we limit ourselves to the description of a demultiplexer i.e. a multi-beam interferometer which is used for separating a light signal from a plurality of overlaid diverse wavelengths into a plurality of light signals from one specific wavelength in each case. In this case the light signal S which, for example, consists of the overlaying of four different wavelengths $\lambda_1$, $\lambda_2$, $\lambda_3$ and $\lambda_4$ is supplied via the waveguide 20 at the free space region 2 of the interferometer. The four light signals separated into the respective wavelengths then leave the interferometer via four waveguides 33 to 36 which are connected at the second free space region 3 of the interferometer. All of the characteristics of the interferometer described in the following also apply to a multiplexer according to the invention except that then light signals are supplied via the waveguides 33 to 36 into the interferometer and after their overlaying in a single optical light signal leave the interferometer via the waveguide 20.

Between the two free space regions 2, 3 there is integrated in a layer of $SiO_2$, for example, the arrayed grating 1 which is also described as a planar arrayed waveguide grating (AWG). It is comprised of a large number of N waveguides which are arranged close to one another without overlapping. In FIG. 1 eleven waveguides 101 to 111 are illustrated as an example. The respective ends of these waveguides 101 to 111 lead in each case onto the front face 21, 31 of the respective free space region 2, 3. As can be seen from FIGS. 2 and 3 these front faces 21, 31 are preferably in the form of an arc of a circle. The respective ends of the N waveguides are evenly distributed on this arc of a circle 21, 31.

Figure 2:
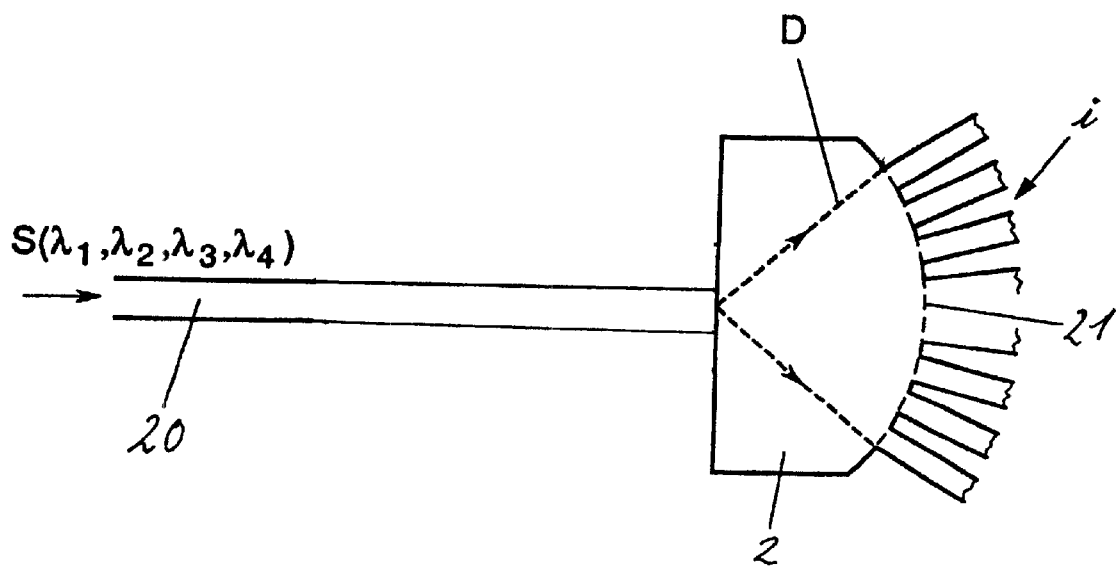
FIG. 2 is a schematic view of a free space region of the multi-beam interferometer according to FIG. 1.

In FIG. 2 the free space region 2 of the interferometer is illustrated with the input waveguide 20. The optical signal S ($\lambda_1$, $\lambda_2$, $\lambda_3$, $\lambda_4$) will enter the free space region 2 at its end lying opposite to the front face 21 via the input waveguide 20. The light signal S will thereby diverge into a cone D in the free space region 2 and be directed towards its circular shaped front face 21. This focal point is fused together with the front face 21. A portion of the diverging beam D of the optical signal S will then penetrate into each of the waveguides i of the arrayed waveguide grating 1 from the front face 21.

The light signal which has penetrated disseminates in all N waveguides up to the front face 31 of the free region 3. In this case, each light signal in the waveguides 101 to 111 is still an overlaying of the four wavelengths $\lambda_1$, $\lambda_2$, $\lambda_3$, and $\lambda_4$ of the signal S transmitted from the input waveguide 20.

From FIG. 1 it can be seen that the waveguides 101 to 111 of the arrayed waveguide grating 1 are arranged in the form of a circle in the plane of the substrate 10. This advantageously results in the fact that the waveguides 101 to 111 differ from one another in their optical length. The waveguide 101 with the smallest radius of curvature correspondingly has the shortest optical length. The respective optical lengths grow together with the radius of curvature from waveguide to waveguide up to a maximum at waveguide 111 with the largest radius of curvature. The difference in optical wavelengths can be a fraction of a $\mu$m up to several $\mu$m.

Figure 3:
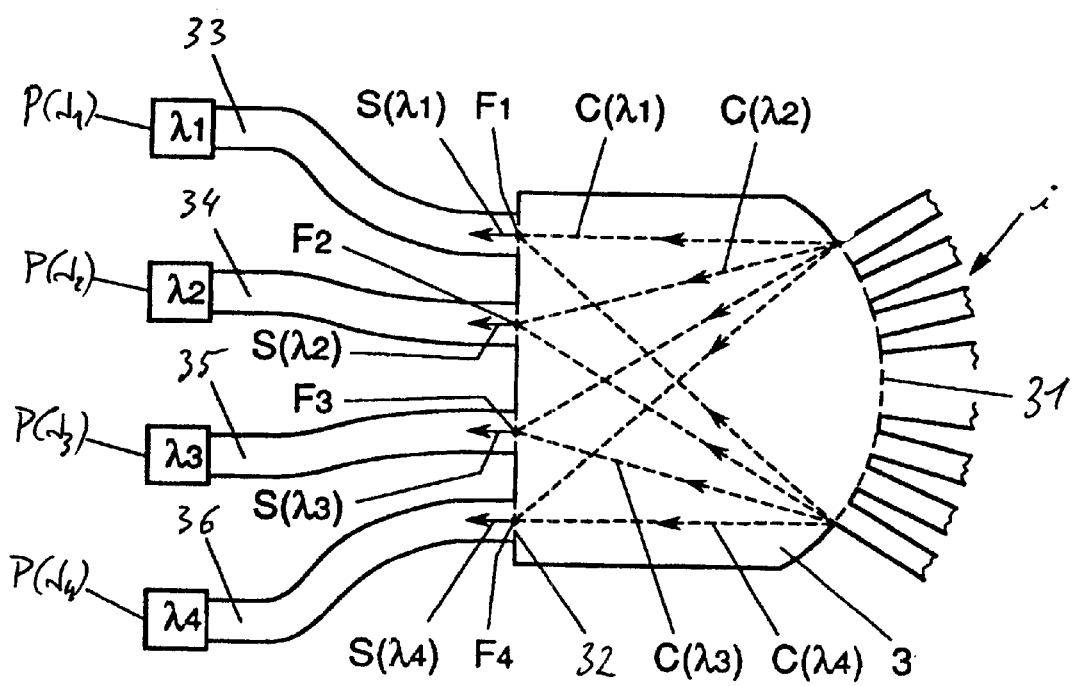
FIG. 3 is a schematic view of a free space region of the multi-beam interferometer according to FIG. 1.

The waveguides i discharge at the front face 31 of the free beam region 3 in the same way as at the front face 21 of the free space region 2. The front face 31 is correspondingly also in the shape of a circle (FIG. 3). Since the light signals which are transmitted from the waveguides i originate from the same light signal S these light signals mix in coherent fashion in the free space region 3. An interference pattern on the focal surface 32 of the free space region 3 is created opposite the front face 31. The differing optical path lengths of the waveguides i cause the light signals C to converge with specific wavelengths $\lambda$ at differing focal points F. Four converging light signals $C(\lambda_1)$ to $C(\lambda_4)$ will form in the free beam region 3 for a light signal S entering into the multi-beam interferometer which consists of the overlaying of, for example, four wavelengths $\lambda_1$ to $\lambda_4$. The maximum values of the converging light signals $C(\lambda_1)$ to $C(\lambda_4)$ are located at separate focal points $F_1$ to $F_4$ on the same focal surface 32. Centred around these focal points $F_1$ to $F_4$ are the four output waveguides 33 to 36 which are connected to the focal surface 32 of the free beam region 3. The light signals $S(\lambda_1)$ to $S(\lambda_4)$ separated in each case are transmitted via these output waveguides 33 to 36. With the construction of the arrayed waveguide grating 1 on the silicon substrate it is impossible to prevent a certain aberration of the interference pattern on the focal surface 32 occurring. This leads on the one hand to increased losses of optical signals in the multi-beam interferometer and to a considerable mutual coupling between adjacent output waveguides 33 to 36. As a result an undesired increase in crosstalk between the channels arises which are characterised by a specific wavelength $\lambda_1$ to $\lambda_4$. There is only a low degree of efficiency in the transmission of optical power between selected input ports (if several are present) to selected output ports of the device.

Figure 4:
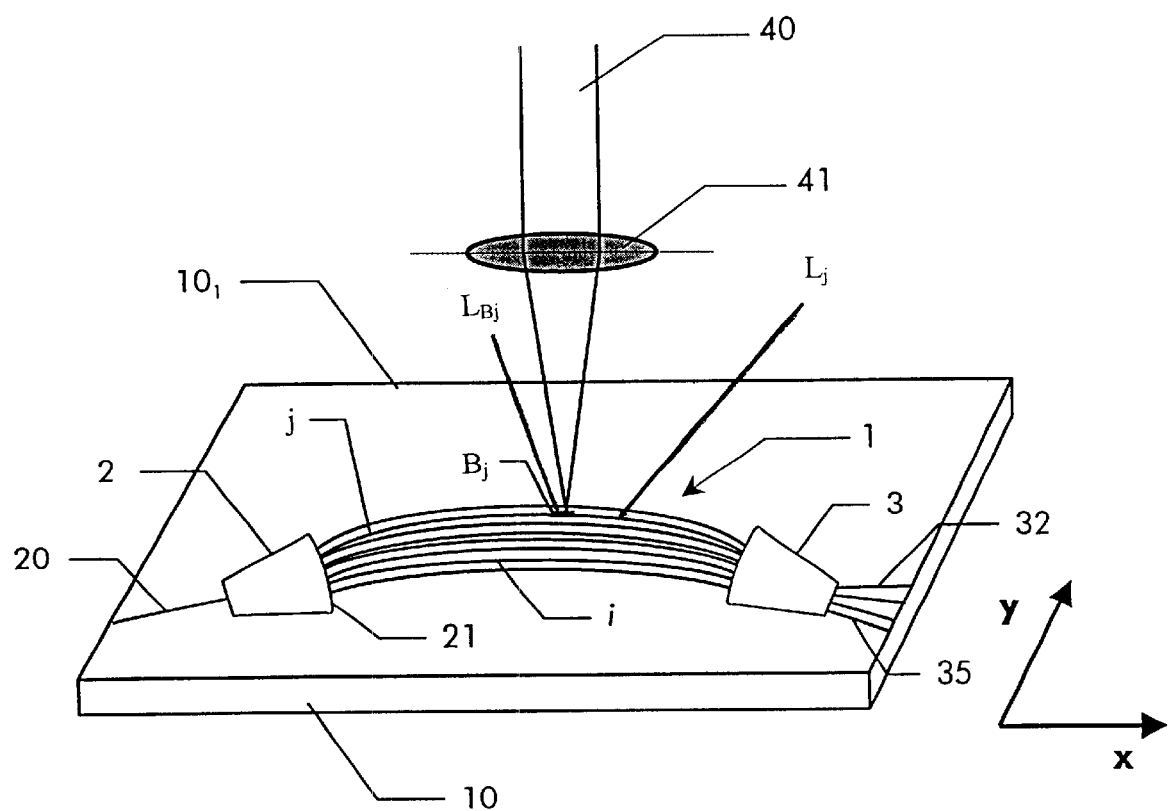
FIG. 4 is a schematic view of the multi-beam interferometer according to FIG. 1 with the UV beam for its trimming.

In order to counter this aberration the entire plate which contains the multi-beam interferometer is connected to a piece of test apparatus. A light signal $S(\lambda_1, \lambda_2, \lambda_3, \lambda_4)$ is fed to the input waveguide 20. The separated light signals are then measured via photodetectors $P(\lambda_1)$ to $P(\lambda_4)$ which are connected to the respective output waveguides 33 to 36 (see FIG. 3). Using the data measured at the photodetectors $P(\lambda_1)$ to $P(\lambda_4)$ it is decided that the phase grating 1 is to be trimmed. This is carried out in accordance with the invention with an optical beam 40. For this purpose the optical beam 40, which is arranged perpendicularly to the plane $10_1$ in which the multi-beam interferometer is located, is focused via a microscopic lens 41 to a specific region $B_j$ of a specific waveguide j of the arrayed waveguide grating 1 (see FIG. 4). In this case either the focused UV beam is controlled in order to be able to treat this region $B_j$ of the waveguide j or, using a fixed focus beam, the plate which contains the multi-beam interferometer is moved in the plane. In both cases the focal point of the focused beam will travel over a specific region $B_j$ of the waveguide. This process can be used on several waveguides i. The respectively radiated regions $B_j$ can have the same or different lengths $L_{Bj}$. The UV radiation leads to a change in the core refractive index in the region $B_j$ of the waveguide j. The difference $\Delta n_j$ between the core refractive index $N_{Bj}$ of a region $B_j$ of a waveguide j and the core refractive index $N_j$ of the respective residual waveguide j amounts to at least $10^{-4}$. This change in the core refractive index in some or all of the waveguides j of the arrayed waveguide grating 1 leads to a specific phase shift $\Delta_j$, of the light signal transmitted via the respective waveguide j. This phase shift $\Delta \phi_j$ is additionally dependent on the length $L_{Bj}$ of the region $B_j$ radiated. A linear correlation between the phase shift $\Delta \phi_j$ and the length $L_{Bj}$ advantageously occurs. For a given wavelength $\lambda$ of the light signal we have the following rule:

$$\Delta \varphi_j = \frac{2\pi}{\lambda} \cdot L_{Bj} \cdot \Delta n_j$$

The change in the refractive index per length can on average be approximately one radiant per mm. Therefore the aberration in the interference pattern for individual wavelengths can be corrected very accurately. In addition this process results in an irreversible trimming of the phase grating. The characteristic of the regions $B_j$ of the respective waveguide j does not change anymore after the process of trimming has been concluded. This is only possible when no doping with, for example, $H_2$ molecules has been carried out and the regions $B_j$ only were radiated with UV radiation.

In FIG. 1 the phase grating 1 with the irradiated regions $B_j$ of the individual waveguides 102 to 111 is schematically illustrated as it would be visible through phase contrast measurements. The different lengths $L_{Bj}$ of these regions $B_j$ which constantly increase from the waveguide with the second smallest radius of curvature 102 to the waveguide 111 with the largest radius of curvature can clearly be seen. In this case only ten of the eleven waveguides were radiated with UV radiation. The arrayed waveguide grating 1 correspondingly exhibits ten regions 202 to 211 in which the core refractive index was reduced or increased by UV radiation.

With the aid of this process according to the invention for trimming an arrayed waveguide grating any aberration in the interference pattern of the multi-beam interferometer can be corrected very accurately. In addition this process has the considerable advantage of only having to be carried out once i.e. that after possibly several procedures in which the waveguides have been irradiated with UV radiation and the interferometer has been satisfactorily tested, it remains permanently trimmed. Different intesities of UV irradiations and/or different durations of irradiations can be used. The treatment of a single waveguide j does not have to be continuous. Several separate regions $B_j$ can also be treated in accordance with the invention on the same waveguide j.

What is claimed is:

1. Integrated optical multi-beam interferometer with an arrayed waveguide grating (1) comprising a large number of N waveguides (i), characterised in that
    at least one (j) of these N waveguides (i) has a selective region ($B_j$) along its optical path length ($L_j$) for trimming of the multi-beam interferometer which is treated only by an irradiation which changes its core refractive index ($n_j$).

2. Multi-beam interferometer according to claim 1, characterised in that
    up to all of these N waveguides (i) each have a selective region ($B_j$) along the respective optical path lengths ($L_j$) which are treated only by a specific irradiation which changes their core refractive index ($n_j$).

3. Multi-beam interferometer according to claim 1, characterised in that
    irradiation takes place with an optical beam characterised in the ultraviolet (UV) range.

4. Multi-beam interferometer according to claim 1, characterised in that
    the region ($B_j$) is suitable for producing a defined phase shift ($\Delta \phi_j$) for a light signal guided in this waveguide (j), with a monotonous, particularly a linear relationship existing between the phase shift ($\Delta \phi_j$) of the treated waveguide (j) and the length ($L_{Bj}$) of the corresponding region ($B_j$).

5. Multi-beam interferometer according to claim 1, characterised in that the regions ($B_j$) have lengths ($L_{Bj}$) which differ from waveguide to waveguide.

6. Multi-beam interferometer according to claim 1, characterised in that
    the difference ($\Delta n_j$) between the core refractive index ($n_{Bj}$) of the at least two treated regions ($B_j$) of the waveguide (j) and the core refractive index ($n_j$) outside of these treated regions ($B_j$) is not the same.

7. Multi-beam interferometer according to claim 1, characterised in that
    the treated region ($B_j$) of the at least one waveguide (j) has a smaller core refractive index ($n_{Bj}$) than the core refractive index ($n_j$) of the waveguide (j) outside of this treated region ($B_j$).

8. Multi-beam interferometer according to claim 7, characterised in that the difference ($\Delta n_j$) between the core refractive index ($n_{Bj}$) of a treated region ($B_j$) of a waveguide (j) and the core a refractive index ($n_j$) of the waveguide (j) outside of this treated region ($B_j$) is at least $-10^{-4}$.

9. Multi-beam interferometer according to claim 1, characterised in that the regions ($B_j$) are treated with strengths of irradiation which differ from waveguide to waveguide.

* * * * *